United States Patent
Agudo Acemel et al.

(10) Patent No.: US 11,285,733 B2
(45) Date of Patent: Mar. 29, 2022

(54) DETERMINING REFLECTED LIGHT INTENSITIES OF LIGHT SOURCES

(71) Applicant: HEWLETT-PACKARD DEVELOPMENT COMPANY, L.P., Spring, TX (US)

(72) Inventors: Manuel Agudo Acemel, Sant Cugat del Valles (ES); Andreas Muller, Sant Cugat del Valles (ES); Xavier Quintero Ruiz, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 21 days.

(21) Appl. No.: 17/047,334

(22) PCT Filed: May 16, 2018

(86) PCT No.: PCT/US2018/032891
§ 371 (c)(1),
(2) Date: Oct. 13, 2020

(87) PCT Pub. No.: WO2019/221721
PCT Pub. Date: Nov. 21, 2019

(65) Prior Publication Data
US 2021/0162769 A1 Jun. 3, 2021

(51) Int. Cl.
*B41J 2/21* (2006.01)
*B41J 29/393* (2006.01)
*G01N 21/55* (2014.01)

(52) U.S. Cl.
CPC .......... *B41J 2/2135* (2013.01); *B41J 2/2117* (2013.01); *B41J 29/393* (2013.01); *G01N 21/55* (2013.01)

(58) Field of Classification Search
CPC ....... B41J 29/393; B41J 11/003; H04N 13/25; H04N 13/254; H04N 1/6044;
(Continued)

(56) References Cited

U.S. PATENT DOCUMENTS

| | | |
|---|---|---|
| 4,685,139 A | 8/1987 | Masuda |
| 6,290,320 B1 | 9/2001 | Beauchamp et al. |
| 6,400,099 B1 | 6/2002 | Walker |

(Continued)

FOREIGN PATENT DOCUMENTS

| | | |
|---|---|---|
| CN | 1162771 | 10/1997 |
| CN | 1850511 | 10/2006 |

(Continued)

*Primary Examiner* — Julian D Huffman
(74) *Attorney, Agent, or Firm* — HP Inc. Patent Department (57) ABSTRACT

The method may comprise depositing print agent of a particular color onto a printable substrate to form a patch of print agent. It may comprise directing radiation from a plurality of radiation sources onto the patch of print agent and onto the printable substrate. Also, may comprise detecting, using a sensor, radiation from the plurality of radiation sources which has been reflected from the printable substrate and radiation from the plurality of radiation sources which has been reflected from the patch of print agent. Further, may comprise measuring, for each of the plurality of radiation sources, an intensity of the radiation reflected from the printable substrate and an intensity of the radiation reflected from the patch of print agent. Also, may comprise selecting, based on the measured intensities, a radiation source of the sources to be associated with the print agent of the particular color.

15 Claims, 4 Drawing Sheets

(58) Field of Classification Search
CPC ....... G03G 15/607; G03G 2215/00329; G03G 2215/00333; G03G 2215/00616
See application file for complete search history.

(56) References Cited

U.S. PATENT DOCUMENTS

| | | | |
|---|---|---|---|
| 6,419,340 | B1 | 6/2002 | Wickham et al. |
| 6,474,767 | B1 | 11/2002 | Teshigawara et al. |
| 6,832,824 | B1 | 12/2004 | Baker et al. |
| 7,690,778 | B2 | 4/2010 | Cai et al. |
| 8,147,026 | B2 | 4/2012 | Rimai |
| 8,279,491 | B2 | 10/2012 | Ishibashi |
| 2007/0047157 | A1 | 3/2007 | Miyahara |
| 2007/0097159 | A1* | 5/2007 | Bastani ................ H04N 1/4015 347/5 |
| 2011/0075162 | A1 | 3/2011 | Seattel et al. |
| 2017/0036467 | A1* | 2/2017 | Seki ..................... B41J 2/04551 |
| 2021/0033463 | A1* | 2/2021 | Ichioka ................. B41J 2/2146 |

FOREIGN PATENT DOCUMENTS

| | | | | |
|---|---|---|---|---|
| CN | 1928972 | | 3/2007 | |
| CN | 101346657 | | 1/2009 | |
| CN | 101557990 | | 10/2009 | |
| CN | 101839868 | | 9/2010 | |
| CN | 205951494 | | 2/2017 | |
| CN | 107791676 | | 3/2018 | |
| EP | 0911175 | | 4/1999 | |
| EP | 3098079 A1 | * | 11/2016 | ............ B41J 2/2142 |
| JP | S-62239180 | | 10/1987 | |
| JP | H-08156235 | | 6/1996 | |
| JP | H-08189860 | | 7/1996 | |
| JP | 2007160726 | | 6/2007 | |
| JP | 2007283615 | | 11/2007 | |
| JP | 2017019200 A | * | 1/2017 | ............ B41J 2/2132 |
| TW | 201704040 | | 2/2017 | |
| WO | WO-9903683 | | 1/1999 | |

* cited by examiner

DETERMINING REFLECTED LIGHT INTENSITIES OF LIGHT SOURCES

BACKGROUND

In some printing apparatuses, a detector arrangement is used to detect light reflected from a surface of a substrate to be printed in order to perform measurements and/or calculations. For example, the arrangement may be used for detecting the edge of the substrate, or for aligning print heads in the printing apparatus.

When printing onto substrates that are not white, reflected light of some colors (i.e. light of some wavelengths) may not be easy to detect by the detector, for example due to the light being absorbed by the substrate.

BRIEF DESCRIPTION OF DRAWINGS

Examples will now be described, by way of non-limiting example, with reference to the accompanying drawings, in which.

DETAILED DESCRIPTION

In some print apparatuses, print agent, such as ink, may be deposited from a print agent distributor, also referred to as a print head, onto a printable substrate, such as paper, cardboard, plastics material, glass, latex and the like. In some examples, a print apparatus may include multiple print heads, for example one print head for each color of print agent that it prints. In one example, a print apparatus may be capable of printing four colors (e.g. cyan, magenta, yellow and black) and may, therefore, include four print heads. Print apparatuses may, in other examples, include a different number of print heads. Each print head may be referred to with reference to the color of ink that it deposits. For example, a print apparatus may include a cyan print head, a magenta print head, a yellow print head and a black print head. Some print apparatuses may include a print head capable of printing white ink onto a substrate; this may be referred to as a white print head. The print apparatus may, in some examples, include an additive manufacturing apparatus for generating three-dimensional objects by forming layers of build material on a print bed. In such examples, the print agent may comprise build material.

The print head(s) may, in some examples, be housed or located within a carriage of the print apparatus. The carriage may move backwards and forwards over the substrate, along a scan axis of the print apparatus. For example, the carriage may move over the width of the substrate, or over a region of the substrate (e.g. a printable region). The print heads may deposit ink in a controlled manner as the carriage and the print heads are moved over the substrate. In other examples, the print head(s) and/or the carriage housing the print head(s) may remain stationary while the substrate moves relative to the print head(s).

A print apparatus may include a detector arrangement or sensor arrangement for use in printing operations, or print management operations, such as print head alignment and detecting the edge of a substrate to be printed. Such a detector arrangement may include multiple light sources and a light detector or sensor for detecting light from each light source, which has been reflected off the surface of the substrate. In some example print management operations, a defined pattern is printed onto the substrate using each of the print heads, and light from each light source is reflected off the pattern towards the light detector. The reflected light may be used for various tasks. For example, the pattern printed by each print head may be analyzed in order to determine whether the print heads are aligned as intended relative to one another. In other examples, light from each light source may be reflected off the substrate itself (i.e. an unprinted region of the substrate), and detection of the reflected light by the light detector may be used to determine the location of an edge of the substrate.

The detector arrangement may be housed within or otherwise attached to the carriage carrying the print head(s). Thus, the detector arrangement may move across a width of the substrate with the print head(s). In other examples, the substrate may move while the detector arrangement remains stationary A substrate or print agent of a particular color, or wavelength, reflects just light of that particular color, or wavelength; light of colors/wavelengths other than the particular color/wavelength is absorbed by the substrate or print agent. Therefore, light of some colors will reflect from the substrate or print agent to a greater extent than light of other colors. Furthermore, light of some colors is, when reflected from the substrate or print agent, likely to be more easily distinguishable than light of other colors. Put another way, the intensity of light reflected from the substrate or print agent of a particular color may vary depending on the color of the light used.

Therefore, it may be more effective to reflect light of a particular color off a substrate or print agent, depending on the color of the substrate and/or the color of the print agent. The present disclosure provides a mechanism capable of determining an appropriate light source to use for each different color of print agent, depending on the color of the substrate to be printed on.

Figure 1:
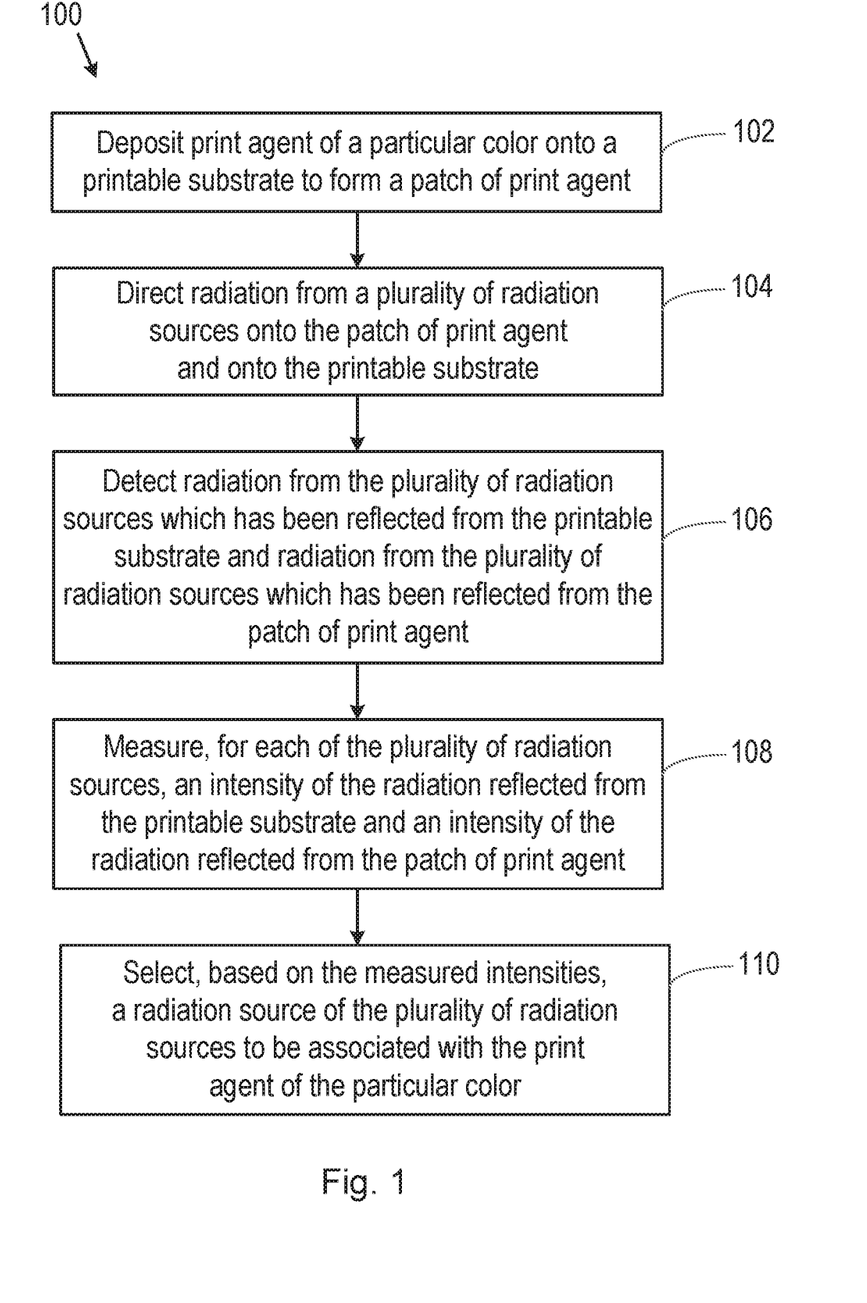
FIG. 1 is a flowchart of an example of a method of identifying a radiation source for use in a printing operation.

FIG. 1 is a flowchart of an example of a method 100. The method 100 may, in some examples, be considered a method of identifying a radiation source for use in a printing operation. The method 100 comprises, at block 102, depositing print agent of a particular color onto a printable substrate to form a patch of print agent. The print agent, or ink, may be deposited onto the printable substrate using a print agent distributor, or print head, as discussed herein. The patch may comprise a region or area of print agent on the substrate. In some examples, the print agent may comprise liquid ink, toner or solid ink. In other examples, other types of print agent may be used. The print agent may be deposited onto a small portion of the substrate, for example a portion of the substrate near to a leading edge (i.e. the first edge of the substrate to reach a printing region near to the print head(s) as the substrate is advanced through the print apparatus). The patch of print agent to be printed onto the printable substrate is to be large enough just for light from a light source to be reflected off the patch of print agent towards a light detector.

The functions that may be performed by the detection arrangement (e.g. the light sources and the light detector) may be performed at any time. In some examples, such functions may be performed before a printing operation commences. For example, a print head alignment operation may be performed using the detection arrangement when a new print head (e.g., a print head or print cartridge for print agent of a new color) is installed into the print apparatus (e.g. installed into the cartridge of the print apparatus). In some examples, a function may be performed when a new type of color of printable substrate is to be printed on by the print apparatus. For example, when a new type of printable substrate is to be fed into the print apparatus for a printing operation, the detection apparatus may be used to detect features of the substrate (e.g. the type of substrate), or to detect the edges of the substrate in order to determine its size.

At block 104, the method 100 comprises directing radiation from a plurality of radiation sources onto the patch of print agent and onto the printable substrate. In some examples, the radiation sources may comprise light sources, such as light emitting diodes (LEDs). In other examples, other radiation sources may be used. For example, radiation sources capable of emitting ultraviolet (UV) radiation and/or infrared (IR) radiation may be used. The plurality of radiation sources may, in some examples, each emit radiation having a different wavelength or frequency and, therefore, each may appear a different color. In some examples, the plurality of radiation sources may comprise four radiation sources: a red radiation source, a blue radiation source, a green radiation source and an orange radiation source. The radiation sources (e.g. LEDs) may be such that radiation (e.g. light) from each radiation source is directed towards the substrate, and radiation reflected from the substrate can be received by a light detector or sensor. In some examples, an optical component, such as a lens, may be associated with a radiation source, or with multiple radiation sources, to aid the directing of the radiation towards the substrate in an intended manner.

In some examples, directing radiation from a plurality of radiation sources (block 104) may comprise directing radiation from each of the plurality of radiation sources in turn. For example, each radiation source may be activated (e.g. pulsed) for a short, defined period in turn.

The method 100 comprises, at block 106, detecting, using a sensor, radiation from the plurality of radiation sources which has been reflected from the printable substrate and radiation from the plurality of radiation sources which has been reflected from the patch of print agent. The sensor may comprise a light detector or radiation detector as mentioned above. The sensor is to be positioned such that radiation directed from the radiation sources reflects from the substrate towards the sensor. Radiation is reflected from the patch of print agent printed onto the substrate and from a portion of the substrate on which print agent has not been deposited. In some examples, an unprinted portion of the substrate onto which the radiation is to be directed may comprise a portion of the substrate adjacent to the printed patch of print agent.

As noted above, the radiation sources (e.g. the LEDs) and the sensor for receiving reflected radiation may be located on or in a carriage carrying the print head(s), In this way, the radiation sources and the sensor can move (partially or entirely) over a width of the substrate. This provides a convenient mechanism by which the radiation source and sensor can move to different positions relative to the substrate, so that radiation from each radiation source can be directed towards and reflected from different portions of the substrate (e.g. from a first portion on which no print agent has been deposited, and from a second portion on which a patch of print agent has been deposited). In some examples, the carriage carrying the radiation sources and the sensor may perform a first pass over the substrate (including the printed patch of print agent) while directing and detecting radiation from a first radiation source, then a second pass over the substrate (including the printed patch of print agent) while directing and detecting radiation from a second radiation source, and so on, until radiation from each of the plurality of radiation sources has been reflected from the substrate and detected by the sensor.

The sensor to detect radiation that has been reflected from the substrate may be any suitable sensor, such as a photosensor. In some examples, the radiation source(s) and sensor may form part of, or function as, a diffuse sensor arrangement. In a diffuse sensor arrangement, the radiation sources and the sensor may be located in the same housing or form part of the same unit. Each radiation source may emit radiation that diffuses over a range of directions. The substrate reflects part of the emitted radiation towards the sensor.

The method 100 comprises, at block 108, measuring, for each of the plurality of radiation sources, an intensity of the radiation reflected from the printable substrate and an intensity of the radiation reflected from the patch of print agent. In some examples, the sensor may include components or functionality capable of measuring the intensity of each radiation source when it receives the reflected radiation from each source. In other examples, the sensor may be in communication with another component (e.g. processing circuitry or a processing apparatus) to measure the intensity of the radiation received by the sensor. In some examples, measuring the intensity (block 108) may comprise measuring the intensity at two discrete times for each radiation source—measuring a first intensity at a first time when radiation is reflected from the portion of the substrate on which a patch of print agent has not been printed, and measuring a second intensity at a second time when radiation is reflected from the patch of print agent printed onto the substrate. In other examples, the intensity may be measured for each radiation source repeatedly or continuously as the radiation sources and the sensor move over the substrate and the printed patch, for example in the carriage. In examples where the intensity is measured repeatedly or continuously over a period of time, a first average intensity may be determined for radiation reflected from the printed patch of print agent and a second average intensity may be determined for radiation reflected from the unprinted portion of the substrate. In other examples, the intensity may be measured in another way. In some examples, a noise-to-signal ratio may be measured; for example, the ratio between the intensity of radiation reflected from the patch of print agent and the intensity of radiation reflected from the substrate may be determined.

At block 110, the method 100 comprises selecting, based on the measured intensities, a radiation source of the plurality of radiation sources to be associated with the print agent of a particular color. The selecting of block 110 may, in some examples, be performed, by a processor associated with the sensor and/or with the print apparatus in which the radiation sources and sensor are incorporated. Each radiation source may reflect radiation from the patch of print agent and from the unprinted substrate at different intensities from one another, for example due to the extent to which the substrate and/or the print agent absorbs the radiation. For example, an intensity of radiation from a first radiation source that has been reflected from the patch of print agent may be two times the intensity of radiation from the first radiation source that has been reflected from the unprinted portion of the substrate. An intensity of radiation from a second radiation source that has been reflected from the patch of print agent may be four times the intensity of radiation from the second radiation source that has been reflected from the unprinted portion of the substrate. Therefore, the second radiation source produces the strongest contrast between the reflections from the substrate and the print agent. In this example, the second radiation source produces the largest range (i.e. the greatest difference) in the intensities of radiation reflected from the patch of print agent when compared to the unprinted portion of the substrate. Thus, in this example, the second radiation source may be selected as the radiation source to be associated with the print agent of the particular color. The associated radiation source may be used for subsequent functions, as described herein.

In some examples, selecting a radiation source (block 110) may comprise identifying, from the measured intensities, the radiation source of the plurality of radiation sources corresponding to the greatest difference between the intensity of radiation reflected from the printable substrate and the intensity of radiation reflected from the patch of print agent. The identified radiation source may then comprise the selected radiation source. In some examples, the selecting (block 110) may be performed using instructions (e.g. as computer-readable code) executable by a processor. Such a processor may be used for other functions performed as part of the method 100.

Consider an example in which a patch of red print agent is printed onto a white substrate. When light from a red LED is directed onto the substrate and onto the printed patch, a detector receiving reflected light would receive a high intensity of light from the substrate, as the white substrate reflects all colors. The detector would also receive a high intensity of light from the red printed patch, as red light is reflected by the red patch. When light from a green or blue LED is directed onto the substrate and onto the printed patch, a detector a detector receiving reflected light would receive a high intensity of light from the substrate, as the white substrate reflects all colors. However, reflections from the red printed patch would be very low or noisy, as the red patch is absorbing a large proportion of the green/blue light. Therefore, the largest difference in reflected intensities (between the substrate and the printed patch) results from the green or blue LED. In other words, the contrast is greater using the blue or green LEDs. Thus, the blue or green LEDs may be selected based on the measured intensities. A similar effect results when a white patch of print agent is printed onto a non-white substrate.

Using the technique of the method 100, it is possible to select a radiation source to be associated with the print agent of the particular color, based on the intensities of radiation reflected from the substrate and from the patch of print agent. In some examples, it is possible to identify the radiation source which produces the greatest contrast between the substrate and the print agent of the particular color, given the color of the substrate. The selected radiation source may be used to perform printing operations, print management operations or calibration operations for the substrate of that color.

While the method 100 described above may be performed for print agent of any color, and with a substrate of any color, the method finds particular use when a non-white substrate is to be printed. When using a white substrate, the substrate is likely to reflect radiation or all colors with the greatest intensity as none of the radiation is absorbed by the white substrate. However, when a non-white substrate is used, radiation of some colors (e.g. wavelengths) may be absorbed. Therefore, without knowing the color of the substrate, it is not possible to know which radiation sources would generate radiation that would be absorbed by the substrate and, thus, which radiation source to use to provide the best contrast. In cases where the substrate is translucent, radiation may be absorbed by a platen supporting the substrate. The method 100 allows this to be determined on the fly, without any prior knowledge of the substrate color. The method 100 also find particular use when a translucent, or partially translucent substrate is to be printed. A translucent substrate may allow some light to pass through, but some light reflected, either by the substrate or by a platen beneath the substrate, on which the substrate is supported. In some examples, a translucent substrate may be partially transparent. Thus, in some examples, the printable substrate is at least partially translucent and/or non-white in color.

When printing onto a non-white substrate or a translucent substrate (or even when printing onto a white substrate), white print agent may be used. Thus, in some examples, the particular color (of the print agent) may be white. The color white is considered to include colors that are slightly off-white, but which are close to white.

In an example, therefore, a patch of white print agent may be printed onto a non-white substrate. Light from a plurality of light sources—for example a red LED, a blue LED, a green LED and an orange LED—is directed onto an unprinted portion of the substrate and onto the printed patch of white print agent. The sensor detects the radiation reflected from each LED in turn, and the intensity of the reflected light is measured for both light reflected from the white patch and light reflected from the non-white substrate. The difference between the intensity of light reflected from the white patch and light reflected from the non-white substrate may then be determined for each LED, and one of the LEDS may be selected based on the determined intensities. In some examples, the LED that corresponds to the largest difference or range between the intensities may be identified and selected. Thus, for print management operations in which reflections are to be detected from white print agent on the substrate of this particular color, the selected LED may be used, as its light, after reflecting from the white print agent, is the most distinguishable (e.g. the brightest) relative to the substrate itself.

Figure 2:
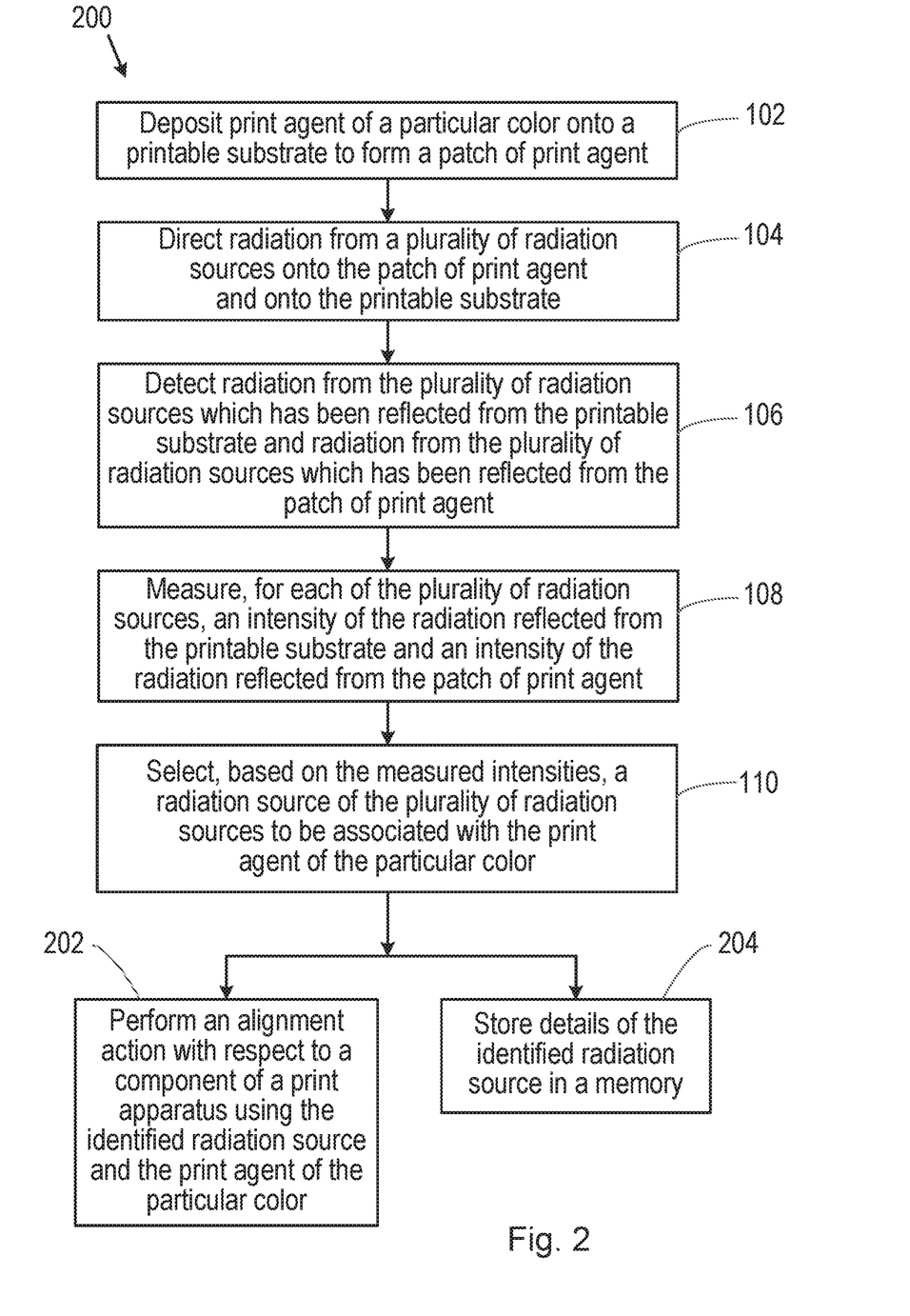
FIG. 2 is a flowchart of a further example of a method of identifying a radiation source for use in a printing operation.

FIG. 2 is a flowchart of a further example of a method 200. The method 200 may, in some examples, be considered a method of identifying a radiation source for use in a printing operation. The method 200 may include blocks of the method 100 discussed above. The method 200 may further comprise, at block 202, performing an alignment action with respect to a component of a print apparatus using the identified radiation source and the print agent of the particular color. The component of the print apparatus in respect of which the alignment action is to be performed may comprise the print head(s) of the print apparatus. Thus, once the appropriate radiation source has been identified (at block 110), the identified radiation source may be used for a function, such as a print management function. An alignment action, as performed at block 202 may include printing a pattern onto the substrate using print agent from each print head (e.g. print agent of multiple different colors). For the print agent of the particular color (e.g. white), the identified radiation source may be used in the alignment process. For print agent of other colors, other radiation sources of the plurality of radiation sources may be used.

At block 204, the method 200 may comprise storing details of the identified radiation source in a memory. Block 204 may, in some examples, be performed instead of block 202. In other examples, block 204 may be performed in addition to block 202. The details may be stored, for example, in a storage medium, such as a memory, associated with the processor and/or with the print apparatus. The details of the identified radiation source may be associated with, or stored in association with, details identifying the nature of the substrate (e.g. the color of substrate, and/or the intensities of light reflected from the substrate). By storing the details of the identified radiation source, the print apparatus may know to use the identified radiation source when it is determined that the same substrate (e.g. a substrate of the same color and/or providing reflections of the same intensities) is to be used. Block 202 or block 204 may be performed following block 110. In some examples, both blocks 202 and 204 may be performed following block 110.

Figure 3:
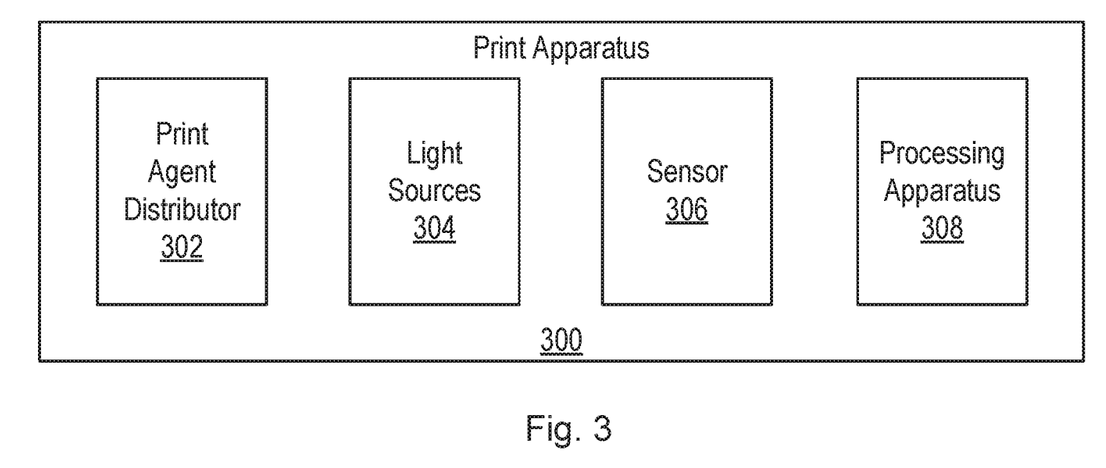
FIG. 3 is a simplified schematic of an example of an apparatus for identifying a radiation source for use in a printing operation.

Another aspect of the present disclosure relates to a print apparatus. FIG. 3 is a simplified schematic of an example of a print apparatus 300. The print apparatus 300 may be to perform blocks of the methods 100, 200 discussed herein.

The print apparatus 300 comprises a print agent distributor 302 to deposit print agent of a first color onto a printable medium. The printable medium may comprise a substrate as described above, such as paper, cardboard, glass, metal, plastics, latex and the like. The print agent distributor 302 may comprise a print head or multiple print heads, for depositing the print agent.

The print apparatus 300 comprises a plurality of light sources 304, each light source to emit light of a particular wavelength towards the printable medium. In some examples, the light sources may comprise light emitting diodes (LEDs). The plurality of light sources 304 may, in one example, comprise four LEDs—a red LED, a blue LED, a green LED and an orange LED.

The print apparatus 300 further comprises a sensor 306 to detect light from each of the plurality of light sources 304, which has been reflected from the printable medium. Thus, light from each light source 304 is reflected off the printable medium and detected by the sensor 306. In some examples, the plurality of light sources 304 are such that each just one light source emits light at a time. The light sources may, for example, emit pulses of light in a series, such that each light source emits light in turn. The sensor 306 (e.g. a photosensor) may, in some examples, comprise a diffuse sensor.

The print apparatus 300 further comprises processing apparatus 308. The processing apparatus may be in communication with the print agent distributor 302, the plurality of light sources 304, and/or the sensor 306. In some examples, the processing apparatus 308 may control or operate the print agent distributor 302, the plurality of light sources 304, and/or the sensor 306. For example, the processing apparatus 308 may control the print agent distributor and/or print head(s) of the print apparatus 300 to deposit print agent in an intended manner. The processing apparatus 308 may control the light plurality of light sources 304 to emit light in a controlled and intended manner. The processing apparatus 308 may communicate with the sensor 306 to receive data received by the sensor. The processing apparatus 308 may perform various functions of the methods 100, 200 described herein.

According to some examples, the processing apparatus 308 is to measure, for each of the plurality of light sources, an intensity of light reflected from the printable medium. Thus, the processing apparatus 308 may measure the intensity of the light received by the sensor 306 that has reflected from a portion of the printable medium which has not been printed on. The processing apparatus 308 is further to measure, for each of the plurality of light sources, an intensity of light reflected from a printed region of print agent of the first color. Thus, the processing apparatus 308 may measure the intensity of the light received by the sensor 306 that has reflected from the portion of the printable medium onto which print agent of the first color has been deposited.

The processing apparatus 308 is further to determine, based on the measured intensities, a light source of the plurality of light sources to be associated with the print agent of the first color. Thus, as described above with reference to block 110, light from one light source may reflect light from the printable medium and from the region of print agent at different intensities from one another. One of the light sources may be selected to be associated with the first color (of print agent). In some examples, the light source may be determined by determining the light source of the plurality of light sources corresponding to the largest range between the intensity of light reflected from the printable medium and the intensity of light reflected from the printed region. The light source responsible for the largest difference (e.g. the greatest range) of intensities between the printable medium reflections and the print agent reflections is identified by the processing apparatus 308.

In some examples, the light source determined by the processing apparatus 308 may be used for function of the print apparatus, such as a print apparatus management function. Thus, in some examples, the processing apparatus 308 may be to perform a calibration operation with regard to the print agent distributor 302 using the determined light source and print agent of a first color. For example, the print agent distributor 302 or a print head may be calibrated based on the particular type/color of printable medium to be printed on during a print operation. The calibration operation may make use of the determined light source to direct light onto the print agent on the printable medium, as light from the determined light source is more distinguishable from the print agent and/or the substrate than light from the other light sources.

The processing apparatus 308 may, in some examples, be to perform an alignment operation with regard to the print agent distributor 302 using the determined light source and print agent of a first color. For example, for print agent of the particular color, the determined light source may be used in the alignment process. For print agent of other colors (e.g. from other print heads), other light sources may be used. In some examples, the identification/determination process discussed herein (e.g, the methods 100, 200) may be performed in respect of each color of print agent to be printed by the print apparatus 300. In this way, a particular light source may be determined for each different color of print agent.

As noted above, while the print apparatus 300 may print any color of print agent on to a printable medium of any color, in some examples, the printable medium may comprise a translucent and/or non-white printable medium. The first color may, in some examples, comprise the color white. Thus, in one example, white print agent may be printed onto a non-white printable medium. The processing apparatus 308 may determine the most appropriate light source to be detected by the sensor after reflecting from the printable medium and the white print agent, in view of the color of the printable medium.

Figure 4:
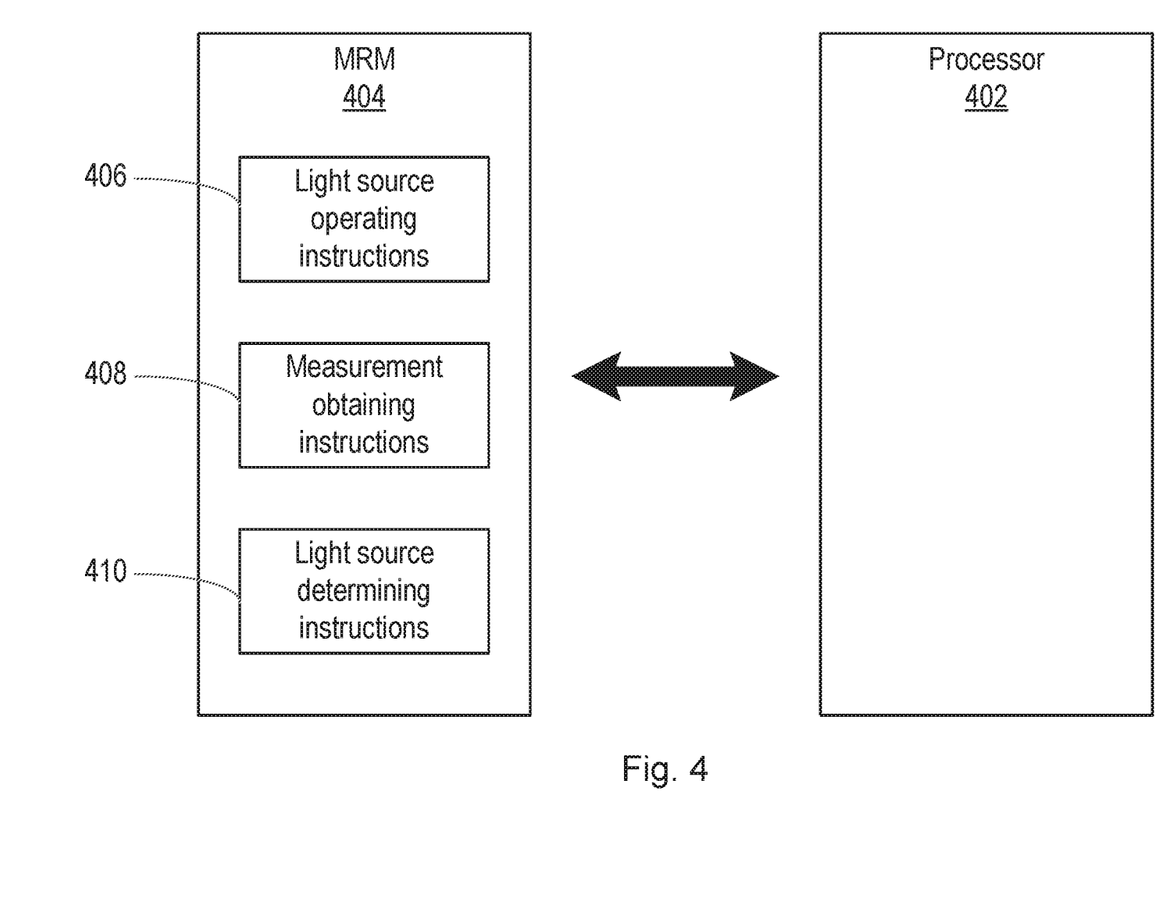
FIG. 4 is a simplified schematic of an example of a machine-readable medium and a processor.

According to a further aspect, the present disclosure relates to a machine-readable medium. FIG. 4 is a simplified schematic of an example of a processor 402 and a machine-readable medium 404. The processor 402 and the machine-readable medium 404 may communicate with one another. The machine-readable medium 404 comprises instructions which, when executed by the processor 402, cause the processor to perform functions associated with blocks of the method described herein. In some examples, the machine-readable medium 404 comprises instructions (e.g. light source operating instructions 406) which, when executed by the processor 402, cause the processor to operate a plurality of light sources to emit light onto a printable substrate and onto a printed pattern formed of print agent of a first color on the printable substrate. The machine-readable medium 404 comprises instructions (e.g. measurement obtaining instructions 408) which, when executed by the processor 402, cause the processor to obtain, for each of the plurality of light sources, a measurement of an intensity of radiation reflected from the printable substrate and a measurement of an intensity of radiation reflected from the printed pattern. The machine-readable medium 404 comprises instructions (e.g. light source determining instructions 410) which, when executed by the processor 402, cause the processor to determine, based on the obtained measurements, a light source of the plurality of light sources to be associated with the print agent of the first color. In some examples, the printable substrate may be translucent, or of a non-white color. The print agent may be white in color.

In some examples, the processor may be to determine the light source by determining which of the plurality of light sources corresponds to the greatest difference between the intensity of radiation reflected from the printable substrate and the intensity of radiation reflected from the printed pattern.

In some examples, the machine-readable medium 404 may comprise instructions (e.g. print head operating instructions) which, when executed by the processor 402, cause the processor to operate a print head to deposit print agent of the first color in the printed pattern on the printable substrate. Operating the print head(s) in this way may be performed prior to the operating of the light sources.

The machine-readable medium 404 may, in some examples, comprise instructions to cause the processor to perform print apparatus management operations or functions. In one example, the machine-readable medium 404 may comprise instructions (e.g. alignment operation instructions) which, when executed by the processor 402, cause the processor to perform an alignment operation on a print head by operating the print head to deposit print agent of the first color on the printable substrate; and operating the determined light source to emit light onto the deposited print agent of the first color on the printable substrate. The light emitted from the determined light source may then be detected by a sensor, as discussed above. A similar process may be performed with regard to print agent of each other color in the print apparatus, the processor may determine whether the print heads are aligned with one another. If alignment adjustments are to be made, the processor may make appropriate adjustments during printing operations, such as delaying the firing of print agent from some nozzles of some print heads.

In some examples, the machine-readable medium 404 may comprise instructions (e.g. data storing instructions) which, when executed by the processor 402, cause the processor to store, in a memory, details associating the determined light source with the first color of the print agent. Thus, as described above, the association may be used by the processor so that the determined light source is used for reflecting from the print agent of the particular color when it is recognized that a printable medium of the same nature (e.g. color, material, translucency, and so on) is to be used.

The methods and apparatus disclosed herein provides a convenient mechanism for determining which light source to use in a sensor arrangement for a particular color of substrate and for print agent of a particular color.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
depositing print agent of a particular color onto a printable substrate to form a patch of print agent;
directing radiation from a plurality of radiation sources onto the patch of print agent and onto the printable substrate;
detecting, using a sensor, radiation from the plurality of radiation sources which has been reflected from the printable substrate and radiation from the plurality of radiation sources which has been reflected from the patch of print agent;
measuring, for each of the plurality of radiation sources, an intensity of the radiation reflected from the printable substrate and an intensity of the radiation reflected from the patch of print agent; and
selecting, based on the measured intensities, a radiation source of the plurality of radiation sources to be associated with the print agent of the particular color.

2. A method according to claim 1, further comprising:
performing an alignment action with respect to a component of a print apparatus using the identified radiation source and the print agent of the particular color.

3. A method according to claim 1, further comprising:
storing details of the identified radiation source in a memory.

4. A method according to claim 1, wherein selecting a radiation source comprises selecting the radiation source of the plurality of radiation sources corresponding to the greatest difference between the intensity of radiation reflected from the printable substrate and the intensity of radiation reflected from the patch of print agent.

5. A method according to claim 1, wherein the printable substrate is at least partially translucent and/or non-white in color.

6. A method according to claim 1, wherein the particular color is white.

7. A print apparatus comprising:
a print agent distributor to deposit print agent of a first color onto a printable medium;
a plurality of light sources, each light source to emit light of a particular wavelength towards the printable medium;
a sensor to detect light from each of the plurality of light sources which has been reflected from the printable medium; and
a processing apparatus to:
measure, for each of the plurality of light sources, an intensity of light reflected from the printable medium;
measure, for each of the plurality of light sources, an intensity of light reflected from a printed region of print agent of the first color; and
determine, based on the measured intensities, a light source of the plurality of light sources to be associated with the print agent of the first color.

8. A print apparatus according to claim 7, wherein the processing apparatus is to:
perform a calibration operation with regard to the print agent distributor using the determined light source and print agent of a first color.

9. A print apparatus according to claim 7, wherein the processing apparatus is to determine the light source by determining the light source of the plurality of lights sources corresponding to the largest range between the intensity of light reflected from the printable medium and the intensity of light reflected from the printed region.

10. A print apparatus according to claim 7, wherein the printable medium comprises a translucent and/or non-white printable medium; and
wherein the first color comprises the color white.

11. A machine-readable medium comprising instructions which, when executed by a processor, cause the processor to:
operate a plurality of light sources to emit light onto a printable substrate and onto a printed pattern formed of print agent of a first color on the printable substrate;
obtain, for each of the plurality of light sources, a measurement of an intensity of radiation reflected from the printable substrate and a measurement of an intensity of radiation reflected from the printed pattern; and
determine, based on the obtained measurements, a light source of the plurality of light sources to be associated with the print agent of the first color.

12. A machine-readable medium according to claim 11, comprising instructions which, when executed by a processor, cause the processor to:
operate a print head to deposit print agent of the first color in the printed pattern on the printable substrate.

13. A machine-readable medium according to claim 11, comprising instructions which, when executed by a processor, cause the processor to:
perform an alignment operation on a print head by:
operating the print head to deposit print agent of the first color on the printable substrate; and
operating the determined light source to emit light onto the deposited print agent of the first color on the printable substrate.

14. A machine-readable medium according to claim 11, wherein the printable substrate is translucent, or of a non-white color, and wherein the print agent is white in color.

15. A machine-readable medium according to claim 11, wherein the processor is to determine the light source by determining which of the plurality of light sources corresponds to the greatest difference between the intensity of radiation reflected from the printable substrate and the intensity of radiation reflected from the printed pattern.

* * * * *